United States Patent [19]
Okazaki

[11] Patent Number: 5,838,512
[45] Date of Patent: Nov. 17, 1998

[54] APPARATUS FOR REPRODUCING DIGITAL SERVO DATA AND DIGITAL USER DATA, FOR USE IN A DISK STORAGE SYSTEM

[75] Inventor: Akifumi Okazaki, Tokyo, Japan

[73] Assignee: Kabushiki Kaisha Toshiba, Kanagawa-ken, Japan

[21] Appl. No.: 713,498

[22] Filed: Sep. 13, 1996

[30] Foreign Application Priority Data

Sep. 20, 1995 [JP] Japan .................................. 7-241944

[51] Int. Cl.⁶ ...................................................... G11B 5/09
[52] U.S. Cl. ...................... 360/51; 360/78.14; 360/78.04
[58] Field of Search ................................. 360/51, 48, 49, 360/78.04, 78.08, 78.14, 77.05, 77.08

[56] References Cited

U.S. PATENT DOCUMENTS

| | | | |
|---|---|---|---|
| 4,669,004 | 5/1987 | Moon et al. | 360/77.08 |
| 5,041,926 | 8/1991 | Ockerse et al. | 360/77.05 |
| 5,164,866 | 11/1992 | Sano et al. | 360/51 |
| 5,177,651 | 1/1993 | Moraru et al. | 360/77.08 |
| 5,193,034 | 3/1993 | Tsuyoshi et al. | 360/51 |
| 5,327,300 | 7/1994 | Satomura | 360/51 |
| 5,384,671 | 1/1995 | Fisher | 360/51 |
| 5,420,730 | 5/1995 | Moon et al. | 360/77.08 |
| 5,680,267 | 10/1997 | Tanaka et al. | 360/51 |

Primary Examiner—Thang V. Tran
Attorney, Agent, or Firm—Limbach & Limbach L.L.P.

[57] ABSTRACT

A data reproducing apparatus for use in a hard disk drive (HDD) reproduces user data and servo data recorded on a disk. The apparatus comprises an A/D converter, a read PLL circuit, and a servo PLL circuit. The A/D converter converts signals read by a read head from the disk, to user data and servo data, both being digital data. The read PLL circuit generates sampling pulses, which are supplied to the D/A converter to reproduce the user data. The servo PLL circuit generates sampling pulses, which are supplied to the D/A converter to reproduce servo data. In the servo areas provided on the disk, the servo data is recorded, together with preamble patterns which the servo PLL circuit uses to perform phase acquisition.

11 Claims, 12 Drawing Sheets

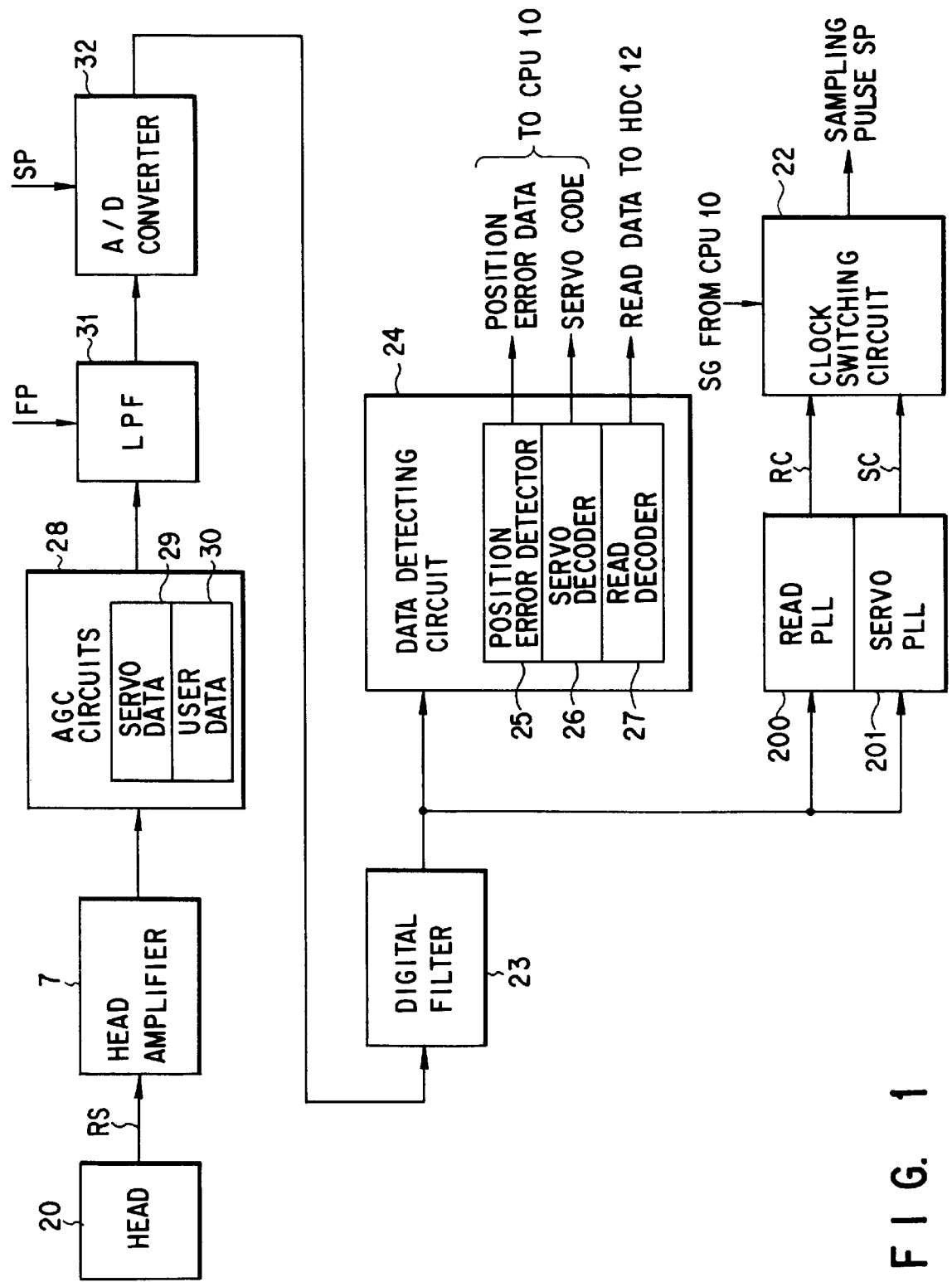
F I G. 1

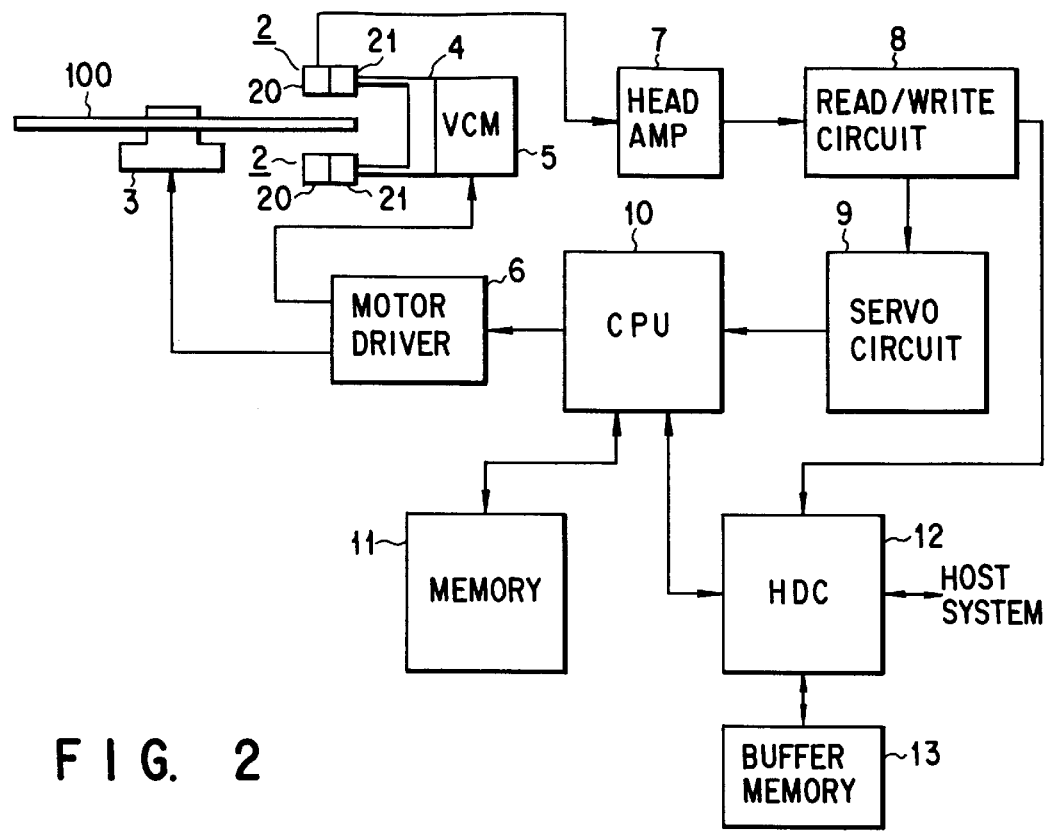
F I G. 2
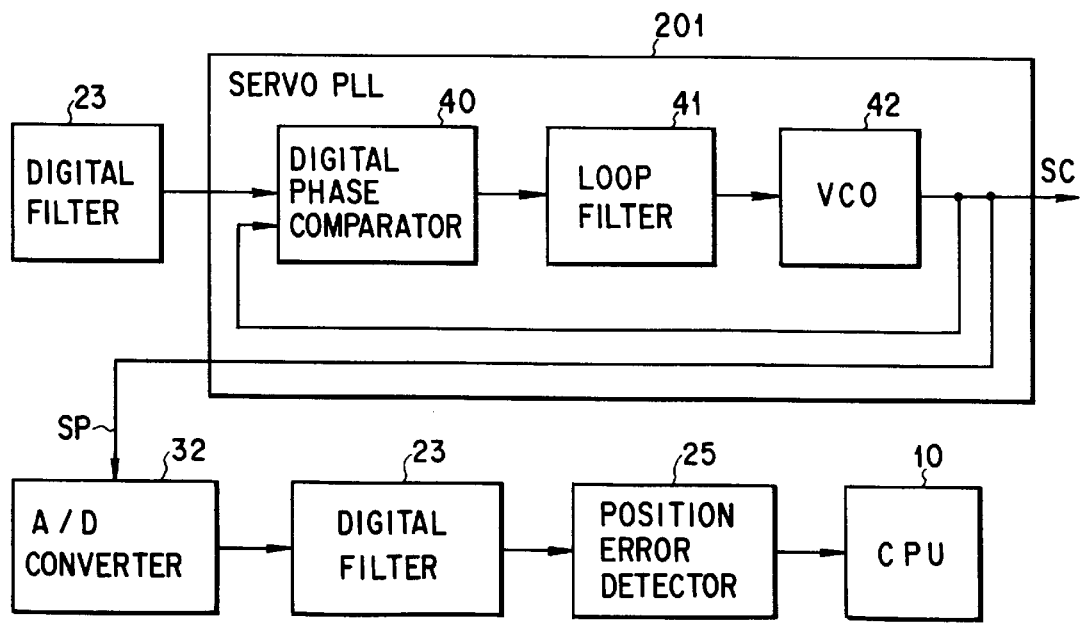
F I G. 3

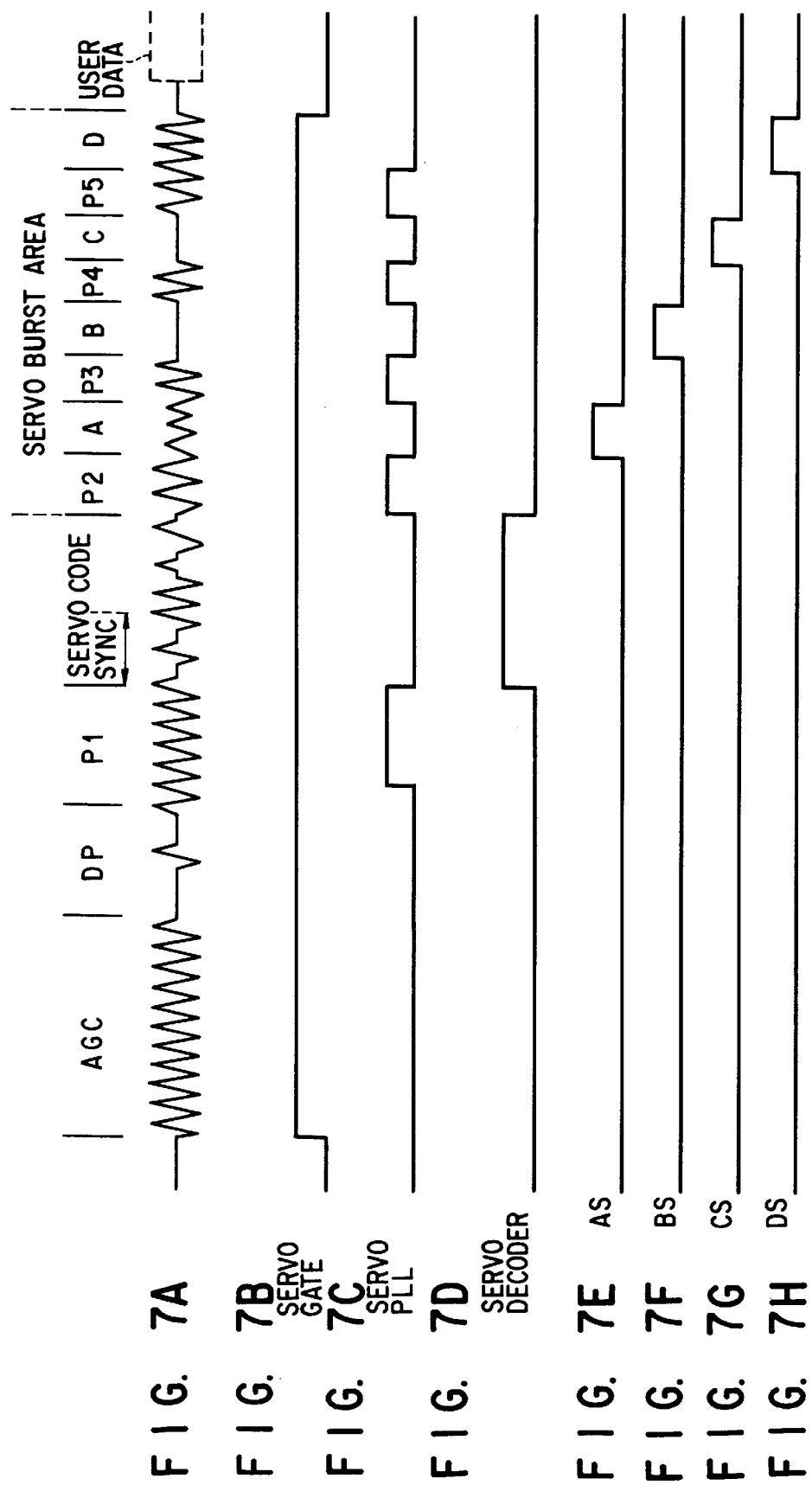

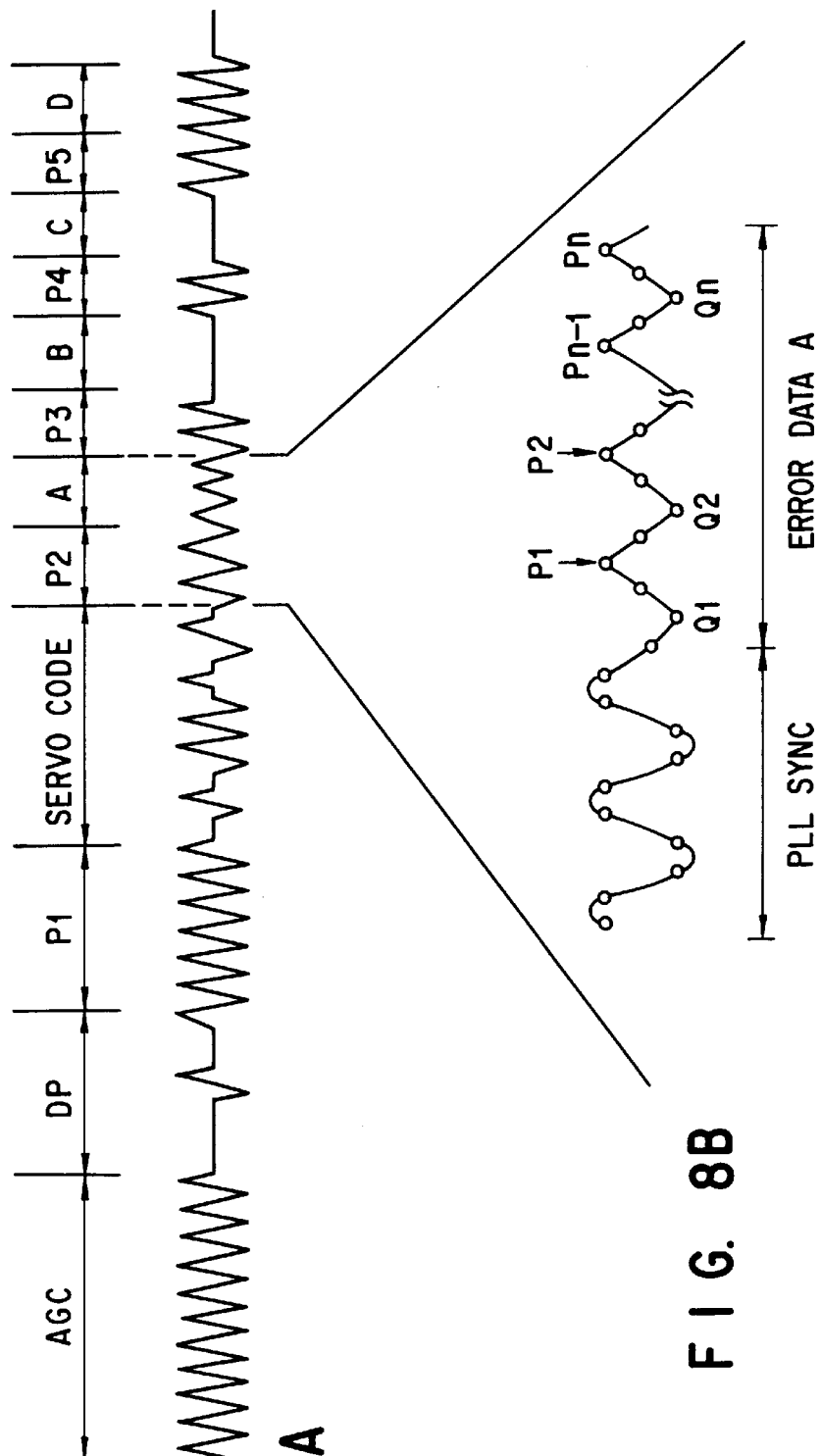
F I G. 8A
F I G. 8B

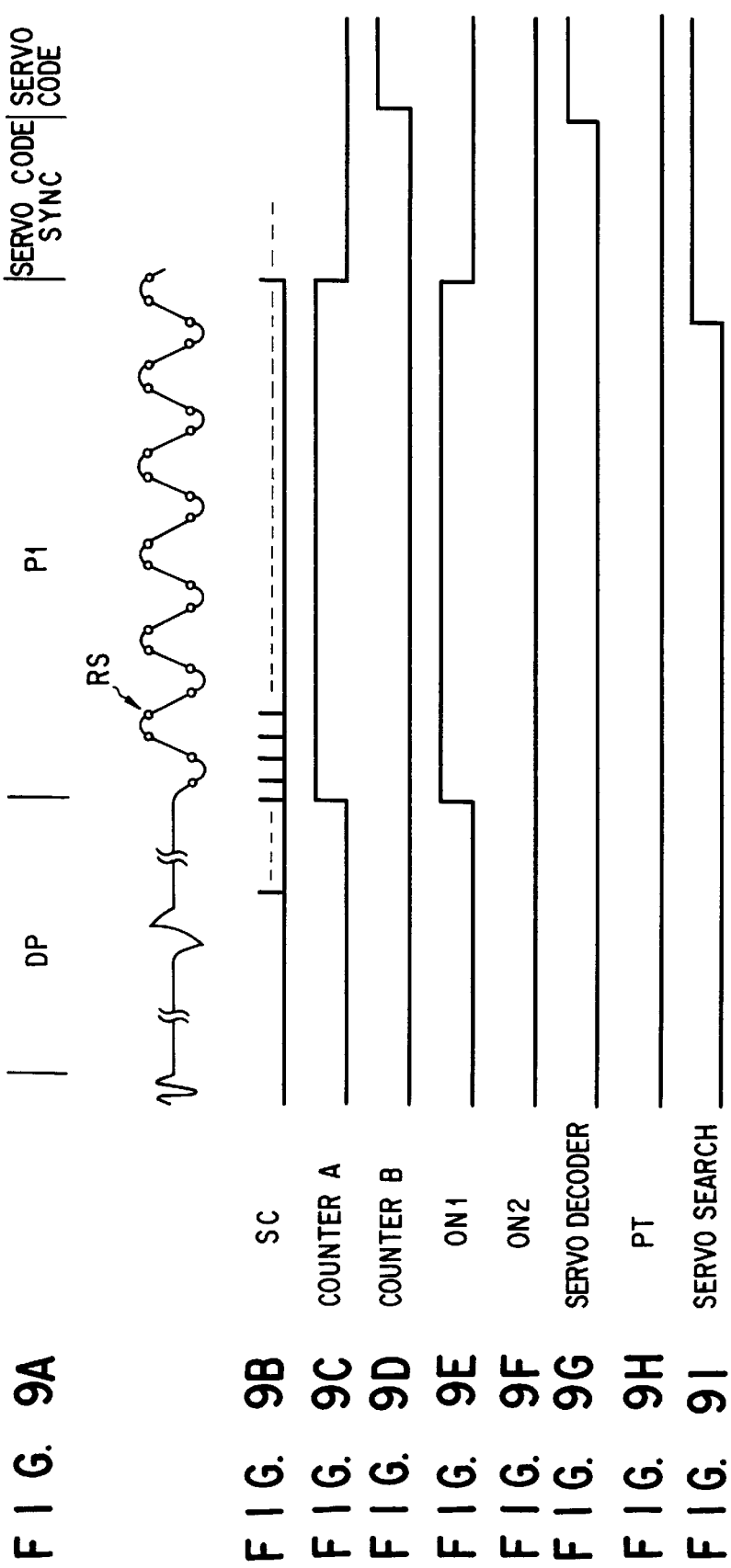

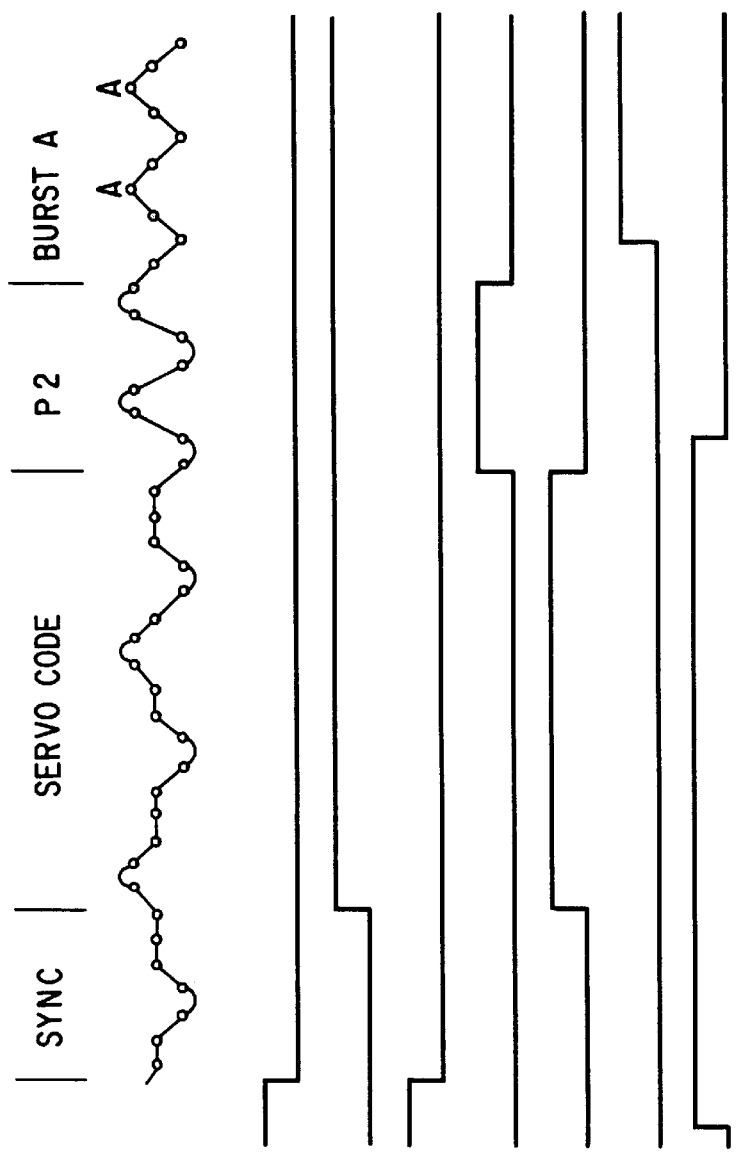

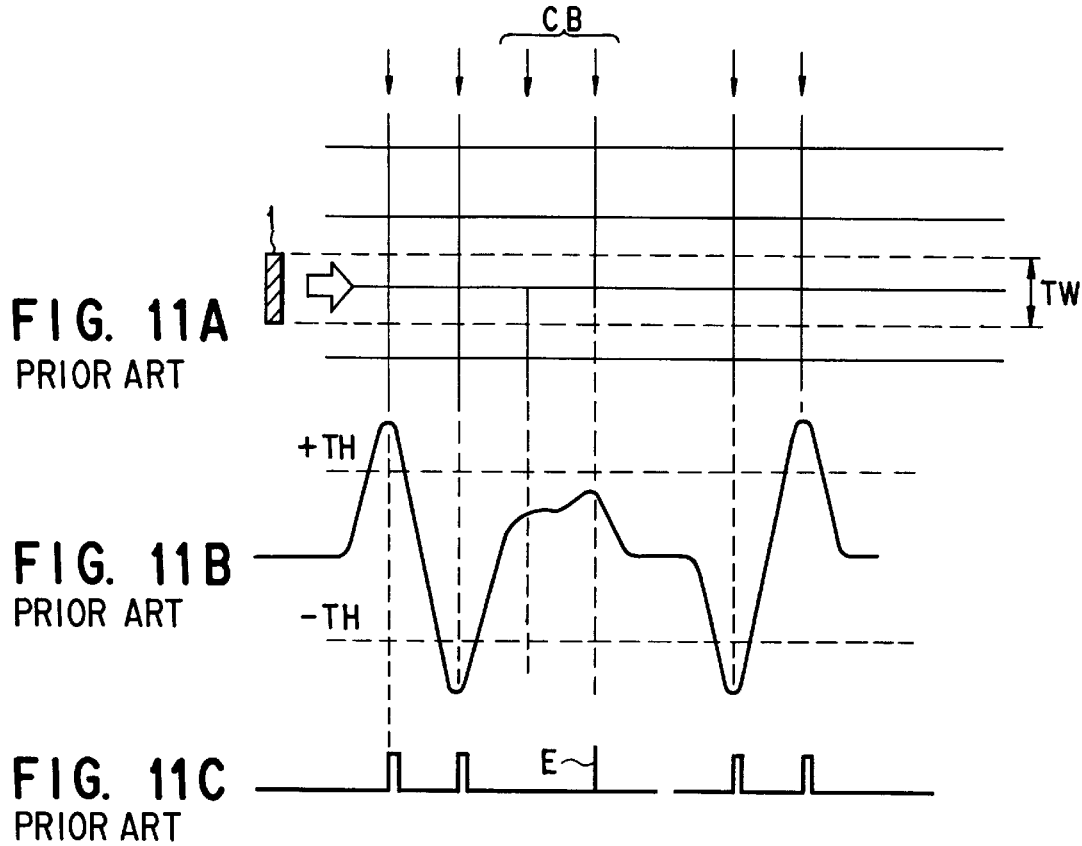
FIG. 11A PRIOR ART
FIG. 11B PRIOR ART
FIG. 11C PRIOR ART
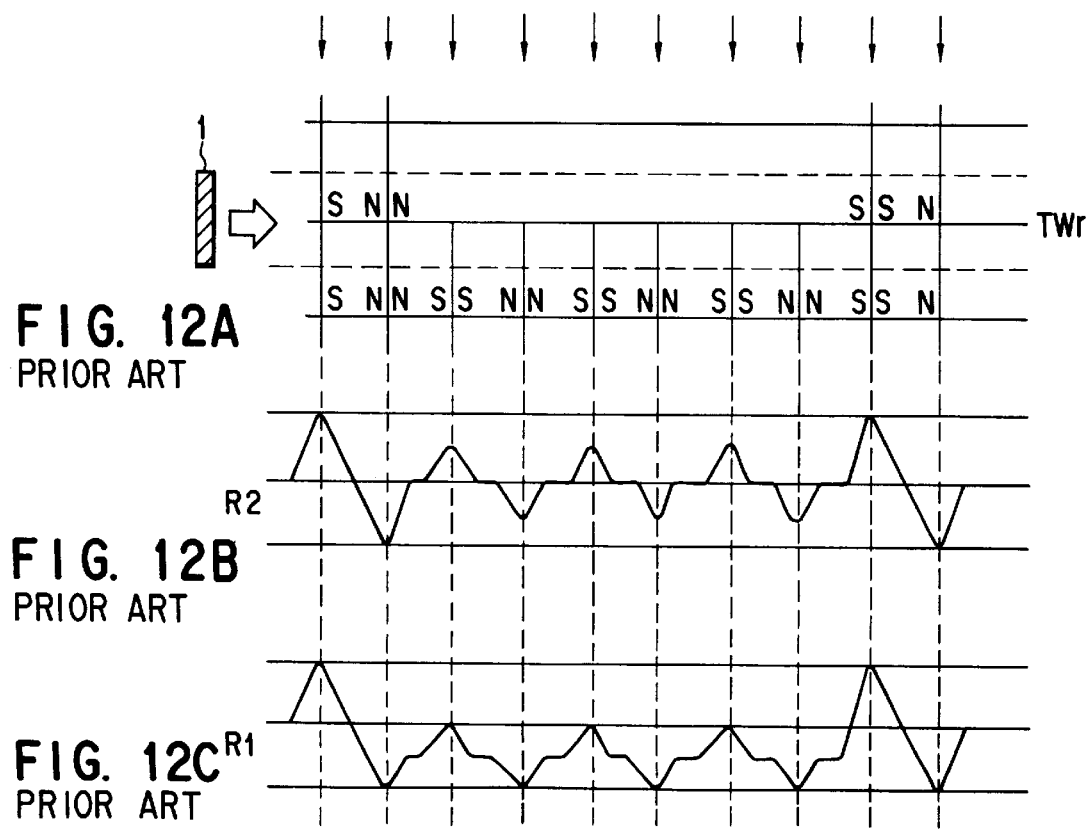
FIG. 12A PRIOR ART
FIG. 12B PRIOR ART
FIG. 12C PRIOR ART

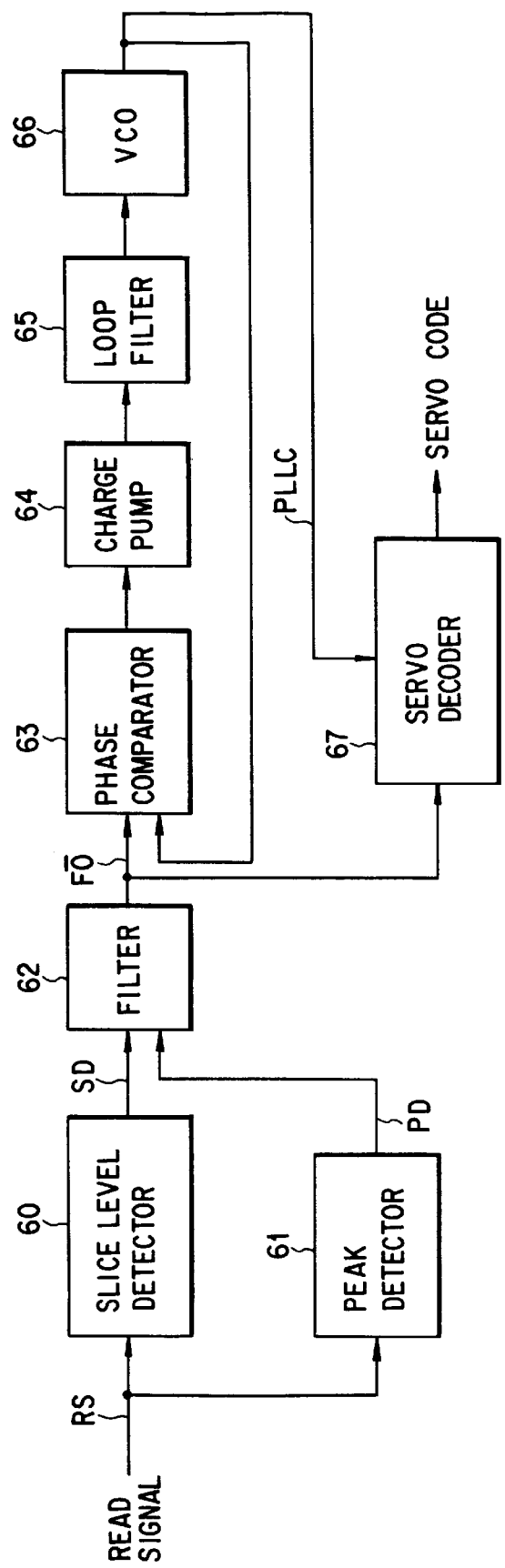
F I G. 15

F I G. 16A   RS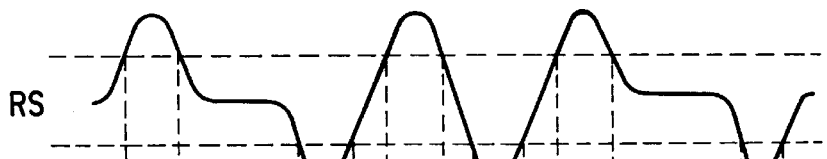
F I G. 16B   SD
F I G. 16C   PD
F I G. 16D   FO
F I G. 16E   PLLC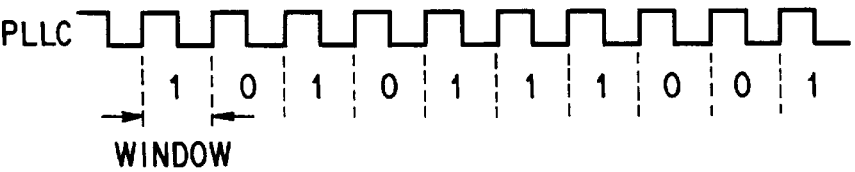

APPARATUS FOR REPRODUCING DIGITAL SERVO DATA AND DIGITAL USER DATA, FOR USE IN A DISK STORAGE SYSTEM

BACKGROUND OF THE INVENTION

1. Field of the Invention

The present invention relates to a servo apparatus for use in a disk storage system such as a hard disk drive, which is designed to position the head of the system in accordance with the servo data recorded in those surface regions of a disk which are located among user data areas.

2. Description of the Related Art

A hard disk drive (HDD) comprises a head for writing data on and reading data from a disk (i.e., a recording medium) and a data recording/reproducing device for processing data to be written on the disk and data read therefrom. The data recording/reproducing device incorporates a data-reproducing circuit. Most data-reproducing circuits developed recently comprise an LSI known as "read channel." The read channel has two major components, which are a decoder and a read signal processing circuit. The read signal processing circuit is designed to process various types of signals the head has read from the disk.

In the hard disk drive (HDD), a head amplifier amplifies an analog signal read by the head from the disk. The signal amplified is supplied to the read signal processing circuit. This circuit has a variable gain amplifier (VGA), a low-pass filter (LPF), an A/D converter and a phase-locked loop (PLL). The VGA can perform automatic gain control. The PLL is provided to generate a sync clock signal for use in reproducing data from the disk. The decoder decodes digital data (USER data) output from the read signal processing circuit, reproducing recorded data (e.g., NRZ-coded data).

In recent years, an magnetoresistive (MR) head and a read signal processing circuit of partial response maximum likelihood (PRML) type have been attracting much attention. This is because the MR head can efficiently work as the data-reproducing head of a high-density recording hard disk drive, and the read signal processing circuit of PRML type is fit for use in the high-density recording hard disk drive. The PRML type circuit has a PR equalizer (digital filter) for performing PR equalization and a viterbi decoder for detecting, with high precision, a series of data items from the waveform of an input signal.

As shown in FIG. 13, the hard disk 100 incorporated in a hard disk drive (HDD) has a recording surface which consists of servo sectors (areas) 101 and data sectors (areas) 102. The servo sectors 101 are located among the data areas 102. As seen from FIG. 14, each servo sector 101 is composed of an AGC (Automatic Gain Control) region, a sector data region, a cylinder data servo code (cylinder data) region and a servo burst data region. Recorded in the AGC region is frequency data for stabilizing the amplitudes of signals. Recorded in the sector data region is data representing numbers assigned to the servo sectors.

A servo code (cylinder data) and servo burst data are used to position the head at a target position (i.e., a target track) on the recording surface of the hard disk 100. More precisely, the servo code is a track address code (cylinder address) for detecting the position of the track at which the head is located at present. The servo burst data is a position error data applied in track following control to position the head in the target track area.

A number of concentric tracks are provided on the recording surface of the hard disk 100. The tracks are divided into zones Z0 to Z2, as illustrated in FIG. 13, if the hard disk drive adopts the CDR (Constant Density Recording) method. The data sectors 102 are formatted so that data may be recorded in the zones Z0 to Z2 in almost the same density.

The user data recorded in any data sector 102 is converted to digital data by the read signal processing circuit of PRML type. Ultimately the data is decoded into NRZ-coded data, which is transferred to a disk controller (HDC) incorporated in the hard disk drive.

The servo data recorded in any servo sector is read by the same head that reads the user data, but is processed in a totally different way from the user data. The servo code is converted into a train of pulses by a pulse generating circuit which has a peak detector. The train of pulses is converted into a train of codes by a servo decoder. The servo burst data is supplied as an analog signal through a low-pass filter (LPF) incorporated in the read signal processing circuit. The peak value of this analog signal is sampled and held by a sample-and-hold circuit. The peak value is converted to digital position error data by an A/D converter incorporated in the read signal processing circuit.

As seen from the above, the user data and the servo data are processed in different ways. Since they are quite different in their frequency characteristics, the low-pass filter provided for removing high-band noise from them is a programmable electronic filter whose filtering characteristics (e.g., cutoff frequency, boost amount and the like) can be changed. The parameters of the low-pass filter are set at certain values suitable for removing high-band noise from the user data, and at other values suitable for removing high-band noise from the servo data.

Like the PRML type signal processing circuit, an MR head plays an important role to record data at high density. Since the MR head is designed exclusively for reading data from the disk, it is used in a hard disk drive, in combination with a data-recording induction head. The MR head and the induction head constitute a read/write head. As shown in FIG. 6, the read/write head has a gap between the MR head 1 and the data-recording head 2. Because of this gap, the read/write head is inclined by a skew angle to a track 3. Hence, the MR head 1 and the data-writing head 2 cannot be simultaneously positioned at the same track in accordance with the servo data.

More specifically, the MR head 1 is located off the center of the target track as shown in FIG. 6, when the data-recording head 2 is correctly positioned at the target track. In this case, the MR head 1 reads the servo data for positioning the data-recording head 2, from an elongated recording area which has a width Wr and which is set off from the target track. This undesirable position the MR head 1 takes is known as "offset position."

If the MR head 1 assumes the offset position as shown in FIG. 11A, it generates a read signal which has the waveform shown in FIG. 11B as it is moved relative to the target track. When servo pulses are sampled from the read signal to decode the servo code, the pulse that should be generated at time E is not generated at all as illustrated in FIG. 11C. This is because, the read signal has an amplitude which corresponds to bit CB and which is less than the upper threshold value +TH. In this regard, it should be noted that magnetization is inverted at the bit CB and that a servo pulse is generated when the amplitude of the read signal exceeds the upper threshold value +TH or decreases below the lower threshold value −TH.

When the induction head is used to read data from the disk as shown in FIGS. 12A, 12B and 12C, it generates a read signal having the waveform R2 shown in FIG. 12B, which reflects changes in the intensity of the magnetic flux emanating from the disk. On the other hand, the MR head 1 generates a read signal having the waveform R1 shown in FIG. 12C. The waveform R1 corresponds to changes in the intensity of the magnetic flux applied to the MR element of the MR head 1. Thus, when the MR head 1 simultaneously detects a magnetic flux emanating from a portion of the disk where magnetization is inverted and a magnetic flux emanating from another portion where magnetization is not inverted, a so-called "DC offset" is observed in the waveform R1. DC offset, if any, makes it difficult to reproduce the servo burst data reliably by detecting the amplitude of the read signal by means of the peak-hold detecting method.

As indicated above, much attention is paid to the MR head and the PRML type read signal processing circuit. This is because the MR head can record data at high density, and the processing circuit can reproduce user data with high efficiency. When the MR head and the PRML type processing circuit are used, however, it is difficult to reproduce the servo data correctly because the servo data differs from the user data in frequency characteristic and should be processed in a different way. Consequently, read errors may occur during the processing of the servo code, and the precision of detecting the amplitude of the servo burst signal may decrease.

SUMMARY OF THE INVENTION

The object of the present invention is to decode a servo code at a low error rate to reproduce servo data and to detect the amplitude of servo burst data with high precision, thereby to enhance the efficiency of reproducing the servo data which is different from user data in frequency characteristic and which needs to be processed in a different manner.

To achieve the object, the present invention provides a servo data reproducing apparatus which comprises: read PLL means for generating a phase-synchronizing clock signal for use in reproducing user data; servo PLL means for generating a phase-synchronizing clock signal for use in reproducing servo data from an analog signal a head has read from a disk; and servo reproducing means for reproducing digital servo data from the analog signal read by the head, in synchronism with the phase-synchronizing clock signal output from the servo PLL means. The servo data consists of servo burst data and a servo code. The servo PLL means generates the clock signal in accordance with preamble signals the head has read from the servo areas of the disk. The servo reproducing means has an A/D converter. The A/D converter receives the clock signal from the servo PLL means and converts the analog read signal to digital servo data, by using the clock signal as sampling pulses.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of a data reproducing apparatus according to a first embodiment of the present invention;

FIG. 2 is a block diagram of a disk storage system incorporating the data reproducing apparatus;

FIG. 3 is a block diagram showing the servo PLL circuit and the circuits peripheral thereto, all incorporated in the data reproducing apparatus shown in FIG. 1;

FIGS. 7A to 7H are a timing chart explaining the operation of the servo data reproducing apparatus according to the present invention;

FIGS. 8A and 8B are a timing chart explaining how servo burst data is reproduced in the data reproducing apparatus according to the invention;

FIGS. 9A to 9I are a timing chart explaining the operation of the servo data reproducing apparatus according to this invention;

FIGS. 10A to 10H are also a timing chart explaining the operation of the servo data reproducing apparatus according to this invention;

FIGS. 11A to 11C are a timing chart explaining the operation of a conventional data reproducing apparatus;

FIGS. 12A to 12C are another timing chart explaining the operation of a conventional data reproducing apparatus;

FIG. 15 is a block diagram showing a modification of the data reproducing apparatus according to this invention; and FIGS. 16A to 16E are a timing chart explaining the operation of the modified apparatus shown in FIG. 15.

DETAILED DESCRIPTION OF THE PREFERRED EMBODIMENTS

Figure 4:
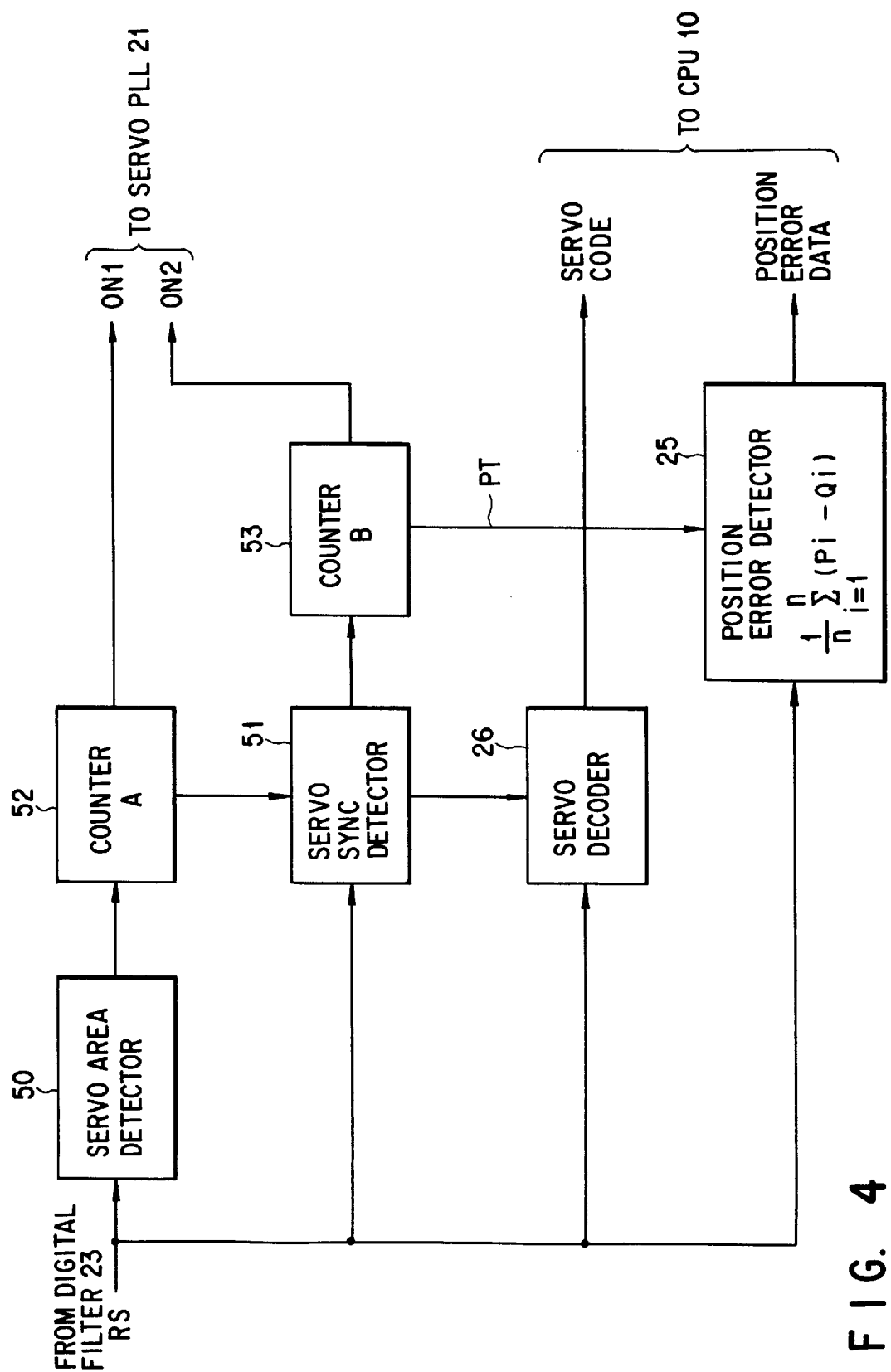
FIG. 4 is a block diagram of a servo data reproducing apparatus according to the invention.

Embodiments of the present invention will be described, with reference to the accompanying drawings.
(Disk Storage System)

FIG. 2 shows a disk storage system incorporating a data reproducing apparatus according to the present invention. The system is a hard disk drive (HDD). As shown in FIG. 2, the system has two read/write heads 2, each composed of a read head 20 and a write head 21. The read head 20 is an MR head, and the write head 21 is an induction head.

In each read/write head 2, the read head 20 and the write head 21 are mounted on a slider. The first head 2 is located at one side of a disk 100, and the second head 2 at the other side of the disk 100. Both read/write heads 2 are held by an actuator 4. The actuator 4 can be driven by a voice-coil motor (VCM) 5, to move the heads 2 in the radial direction of the disk 100 and position them at a target track. In view of this, the actuator 4 is a major component of the head-driving mechanism. The VCM 5 receives a drive current from a motor driver 6, which is controlled by a CPU 10.

Figure 13:
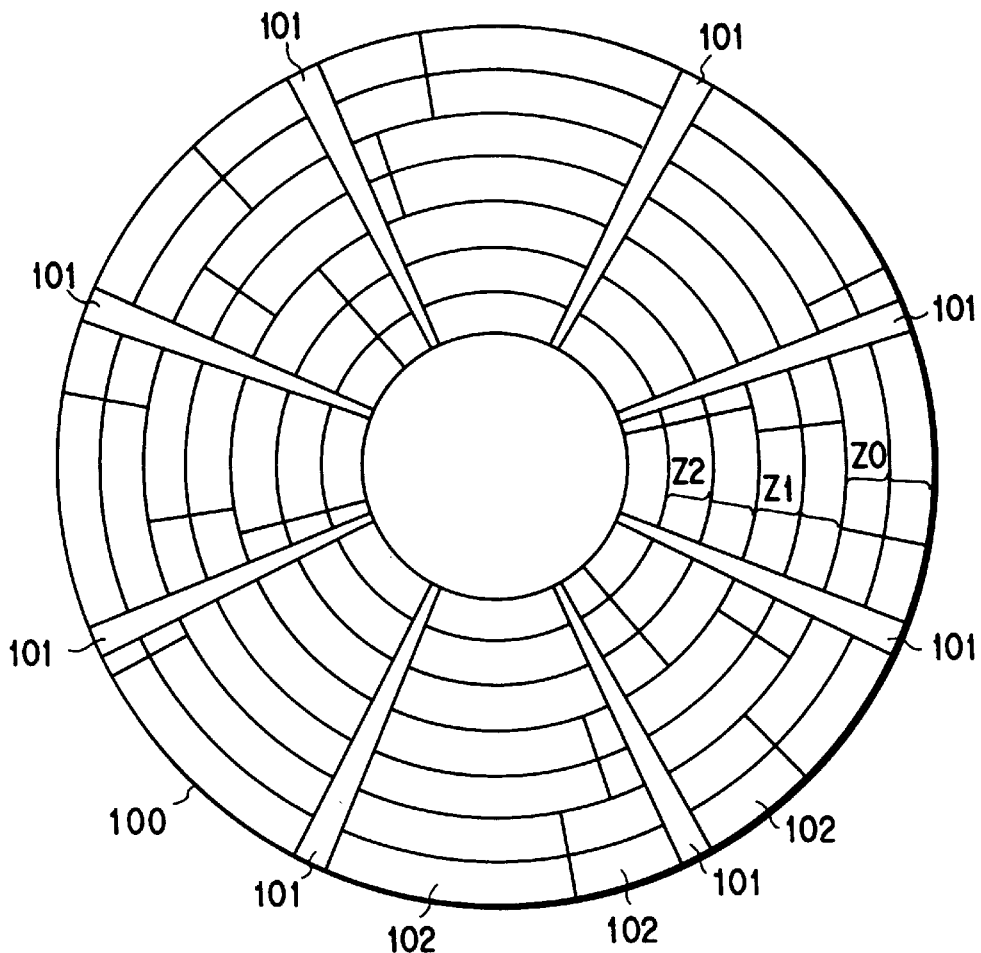
FIG. 13 is a diagram representing a conventional disk format.

The motor driver 6 is a so-called double driver for driving not only the VCM 5 but also a spindle motor 3. The spindle motor 3 is provided to spin the disk 100 at high speed. The disk 100 is secured to the shaft of the spindle motor 3. (One or more additional disks may be secured to the spindle motor 3 in order to increase the storage capacity of the disk storage system. If so, additional read/write heads are connected to the actuator 4.) The disk 100 is CDR-formatted, having a number of concentric tracks on each side as is illustrated in FIG. 13.

As shown in FIG. 2, the disk storage system comprises a head amplifier 7, a read/write circuit 8, a servo circuit 9, a memory 11, a disk controller (HDC) 12, and a buffer memory 13. The read/write circuit 8 is an integrated circuit designed to process signals in order to read data from the disk 100 and write data on the disk 100.

When the disk storage system is set in the data-reading mode, the head amplifier 7 amplifies the signal RS each read head 20 has read from the disk 100. The read signal RS thus amplified is supplied to the read/write circuit 8. The circuit 8 performs AGC (Automatic Gain Control) amplification, filtering, digital conversion, decoding and the like on the read signal RS, thereby generating NRZ-coded data from the read signal RS. The NRZ-coded data is transferred from the circuit 8 to the disk controller 12.

When the disk storage system is set in the data-writing mode, the read/write circuit 8 encodes the NRZ-coded data transferred from the disk controller (HCD) 12, thus generating, for example, RLL (Run-Length Coded) data. The RLL data is supplied to the head amplifier 7. The amplifier 7 amplifies the RLL data, which is supplied to the write head 21.

The CPU 10 is the main component of the control unit incorporated in the disk storage system (i.e., the HDD). The CPU 10 may be combined with an A/D converter and a D/A converter, constituting a so-called microcontroller. It accesses the memory 11 composed of a ROM and a RAM and controls the motor driver 6 to achieve the positioning of the read/write heads 2. The ROM of the memory 11 stores control programs (firmware) for controlling the CPU 10.

The servo circuit 9 decodes the servo code. In accordance with the servo code decoded, the CPU 10 carries out a seek operation, moving the read head 20 to the target track. Further, the CPU 10 receives the servo burst data and detects a position error of the head 20 from the servo burst data which is used as position data. The CPU 10 then generates a control signal from the position error. The control signal is supplied via the D/A converter to the motor driver 6, to eliminate the position error. More precisely, controlled by the control signal, the motor driver 6 drives the VCM 5. The VCM 5 drives the actuator 4, which in turn moves the read/write head 2 to the target position.

The memory 11 has an EEPROM (Electrically Erasable and Programmable Read-Only Memory), besides the ROM and the RAM. The RAM has work areas for the CPU 10. The EEPROM is provided to store various parameters for controlling some components of the disk storage system. Among these parameters is data for identifying the servo sectors and data sectors provided on each side of the disk 100. Since the disk 100 is CDR-formatted, the concentric tracks are divided into a plurality of zones. The parameters of these zones are stored in the EEPROM. In CDR format, each zone consists of the same number of servo sectors and a different number of data sectors.

The disk controller (HDC) 12 is connected to the CPU 10 and functions as an interface between the CPU 10 and a host system. The HDC 12 is a controller for controlling the transfer of read data and write data which are user data items. That is, the disk controller 12 transfers read/write commands, the read data and the write data between the host system and the CPU 10. Furthermore, it controls the buffer memory 13, whereby the buffer memory 13 temporarily stores the read data and the write data.

(Data Reproducing Apparatus)

FIG. 1 shows the data reproducing apparatus of the invention, which is incorporated in the disk storage system illustrated in FIG. 2. The apparatus is designed to reproduce both servo data and user data. It is provided partly in the read/write circuit 8, and partly in the servo circuit 9.

As shown in FIG. 1, the apparatus comprises a read PLL circuit 200 and a servo PLL circuit 201, each designed to generate a phase-synchronizing clock signal. More correctly, the read PLL circuit 200 generates a phase-synchronizing clock signal RC (hereinafter referred to as "read clock signal") which is used to reproduce user data from a read signal RS generated by each read head 20. The servo PLL circuit 201 generates a phase-synchronizing clock signal SC (hereinafter referred to as "servo clock signal") which is used to reproduce servo data from the read signal RS.

As shown in FIG. 1, the data reproducing apparatus further comprises a clock switching circuit 22, a digital filter 23, a data detecting circuit 24, an AGC circuit 28, a low-pass filter (LPF) 31, and an A/D converter 32.

The AGC circuit 28 is composed of a servo data section 29 and a user data section 30. Either the section 29 or the section 30 is selected under the control of the CPU 10. The low-pass filter 31 is a programmable electronic filter. Its filtering characteristic can be varied in accordance with the filter parameters FP set by the CPU 10. The parameters FP are usually a cutoff frequency and a boost amount. The low-pass filter 31 removes noise from the read signal RS (i.e., an analog signal) supplied from the head amplifier 7 through the AGC circuit 28.

The A/D converter 32 receives the read clock signal RC from the read PLL circuit 200 or the servo clock signal SC from the servo PLL circuit 201. Using the signal RC or SC as sampling pulses SP, the A/D converter 32 converts the read signal RS to digital data. The digital data is supplied to the digital filter 23, which performs equalization on the digital data. The digital data output from the digital filter 23 is supplied to the data detecting circuit 24.

The data detecting circuit 24 extracts from the digital data read data and servo data which are user data items. The circuit 24 comprises a position error detector 25, a servo decoder 26 and a read decoder 27. The read decoder 27 provides, for example, a viterbi decoder and decodes the read data into an NRZ-coded data. The NRZ-coded data is supplied to the disk controller (HDC) 12. The controller 12 supplies the user data to the buffer memory 13 and transfers the same to the host system, in units of sectors. The servo decoder 26 decodes the servo code which is contained in the servo data and which represents cylinder data (i.e., a track address) and a sector number. The position error detector 25 extracts position error data from the servo burst data (usually, consisting of one-phase position data items A and B and two-phase position data items C and D). The position error data and the servo code, output from the position error detector 25 and the servo decoder 26 are supplied to the CPU 10.

The CPU 10 performs calculations of $(A-B)/(A+B)$ and $(C-D)/(C+D)$, thereby obtaining the position error each read/write head 2 has with respect to the target track. More specifically, the CPU 10 determines the position of the read/write head 2 from the reproduced servo code immediately after the position control of the read head 20 is achieved. The CPU 10 then obtains the position error from the position error data reproduced. This position error data is applied to move the read head 20 minutely to a desired position with respect to the target track (usually, the center of the target track).

To reproduce the user data, the clock switching circuit 22 selects the read clock signal RC generated by the read PLL circuit 200, supplies the signal RC as sampling pulses to the A/D converter 32 and supplies the signal RC as synchronizing pulses to the read decoder 27. To reproduce the servo data, the clock switching circuit 22 selects the servo clock signal SC generated by the servo PLL circuit 201 and supplies the signal RC as sampling pulses to the A/D converter 32 and supplies the signal RC as synchronizing pulses to the position error detector 25 and the servo decoder 26. The clock switching circuit 22 is operated by the servo gate signal SG output from the CPU 10. While the servo gate signal SG remains at high level, the circuit 22 keeps selecting the servo clock signal SC. While the servo gate signal SG remains at low level, the circuit 22 keeps selecting the read clock signal RC.

The servo code is a train of codes. So is the user data. The servo code is a gray code recorded in a servo sector of the disk 100, and the user data is RLL (Run Length Limited) coded data. By contrast, the servo burst data is an analog signal to generate an amplitude corresponding to the position of the read head 20. The A/D converter 32 samples and holds the peak value (amplitude) of the burst pattern and converts the peak value to digital data. This digital data is supplied to the position error detector 25.

(Servo PLL Circuit and Its Peripheral Circuits)

Figure 5:
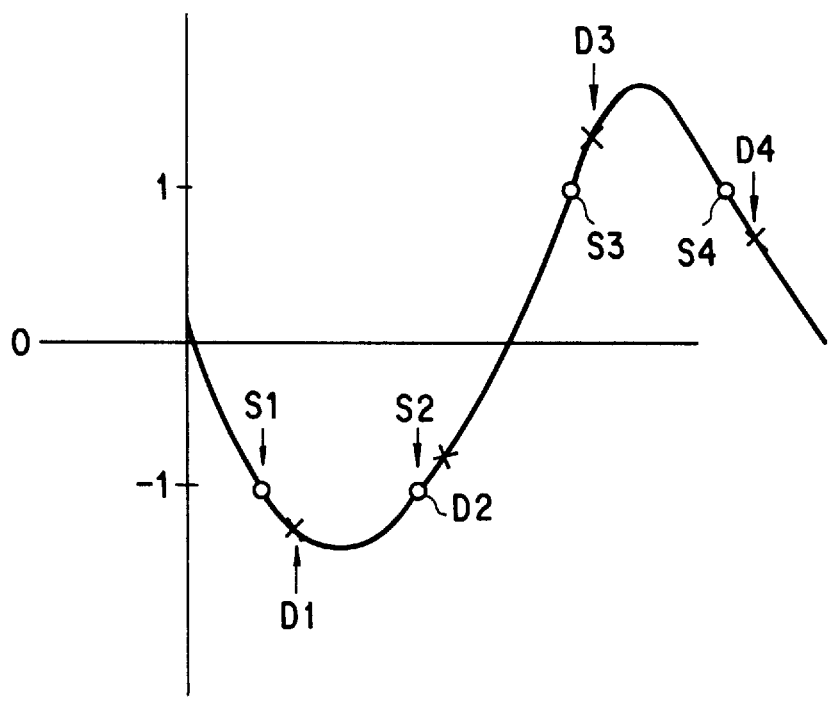
FIG. 5 is a diagram explaining the operation of the servo PLL circuit incorporated in the apparatus shown in FIG. 1.
Figure 6:
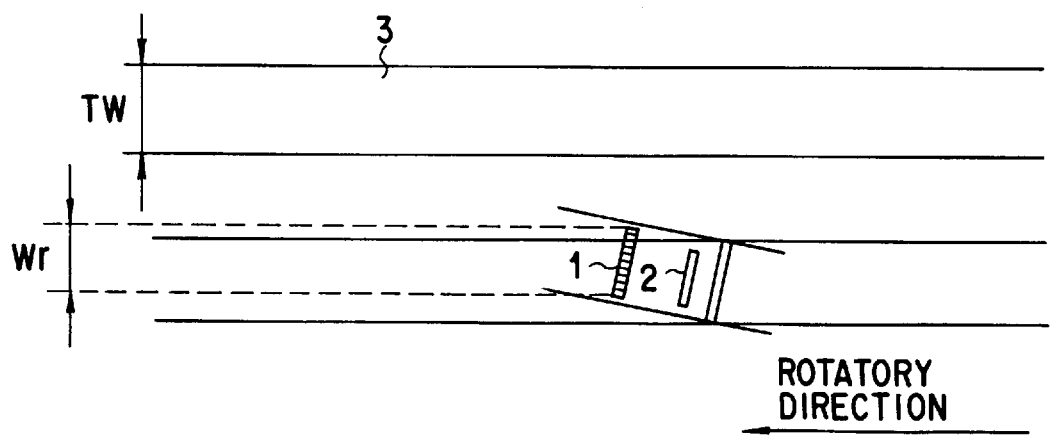
FIG. 6 is a diagram explaining the operation of the conventional read/write head.

As shown in FIG. 3, the servo PLL circuit 201 is a digital phase-locked loop circuit of ordinary type, like the read PLL circuit 200. The servo PLL circuit 201 comprises a digital phase comparator 40, a loop filter 41 and a voltage-controlled oscillator (VCO) 42. Supplied to the first input of the comparator 40 is the digital data output by the digital filter 23, which is equivalent to either servo code or the servo burst data. Supplied to the second input of the comparator 40 is the servo clock signal SC output by the VCO 42. The servo PLL circuit 201 supplies the servo clock signal SC (i.e., the phase-synchronizing output of the VCO 42) as sampling pulses SP to the A/D converter 32, in accordance with the level of the servo gate signal SG supplied from the CPU 10. As seen from FIG. 5, the digital phase comparator 40 detects a phase error of 0 when the read signal RS is input and output at S1 and S2 or at S3 and S4, respectively. The comparator 40 detects a phase error of 0.4 when a phase delay occurs; D1−D2=−1.2+0.8=−0.4, or D3−D4=1.2−0.8=0.4.

(Phase Acquisition in Servo PLL Circuit)

Figure 14:
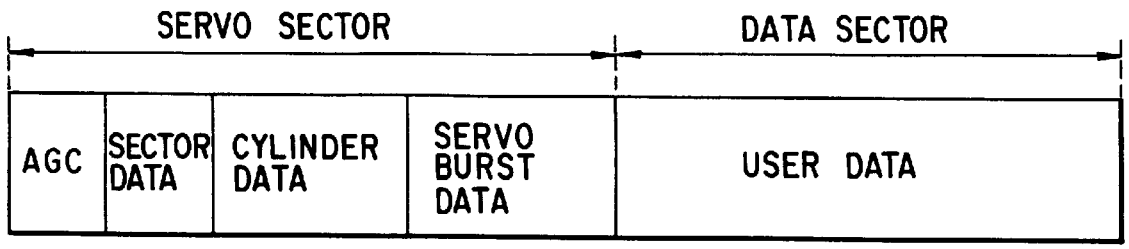
FIG. 14 is a diagram illustrating a conventional track format.

As shown in FIG. 7, preamble patterns P1 to P5 which the servo PLL circuit 201 uses to perform phase acquisition operation are recorded in each servo sector 25 (servo area) provided on the disk 100. The preamble patterns P1 to P5 are of the same type as those used in the read PLL circuit 200 (conventional PLL circuit) to accomplish phase acquisition. The conventional HDD has no component equivalent to the servo PLL circuit 201, and no patterns equivalent to the preamble patterns P1 to P5 are recorded in the servo sectors of the disk (see FIG. 14).

The preamble pattern P1 is recorded in the area immediately preceding the servo code. The servo PLL circuit 201 uses the pattern P1 to carry out phase acquisition in order to decode the servo code. The servo code contains a sync pattern which synchronizes the servo clock signal SC output from the servo PLL circuit 201. Recorded immediately before the preamble pattern P1 is a servo detecting pattern DP for detecting the servo data.

The preamble patterns P2 to P5 are recorded immediately before servo burst patterns A to D, respectively. The servo PLL circuit 201 uses the patterns P2 to P5 to perform phase acquisition in order to generate servo burst data (i.e., position error data).

The servo data is reproduced while the CPU 10 is outputting the servo gate signal SG as is illustrated in FIG. 7B. When the signal SG rises to high level, the AGC amplifier incorporated in the servo data section 29 of the AGC circuit 28 is turned on, and the CPU 10 supplies the low-pass filter 31 with a parameter for filtering the servo data. The clock switching circuit 22 selects the servo clock signal SC output from the servo PLL circuit 201 and supplies the signal SC as sampling pulses to the A/D converter 32.

The servo PLL circuit 201 performs phase acquisition while the read head 20 is reading the preamble pattern P1 as is seen from FIG. 7C, and outputs a servo clock signal SC which is synchronous with the sync pattern contained in the servo code. The A/D converter 32 converts the read signal RS to digital data, using the servo clock signal SC output from the servo PLL circuit 201 as sampling pulses SP. (The read signal RS corresponds to the servo code.) The servo decoder 26 of the data detecting circuit 24 decodes the digital data input from the A/D converter 32 via the digital filter 23, thereby generating cylinder data (track address), in synchronism with the servo clock signal SC as is illustrated in FIG. 7D.

Next, the servo PLL circuit 201 carries out phase acquisition in order to reproduce the servo burst patterns A to D while the read head 20 is reading the preamble patterns P2 to P5. The A/D converter 32 converts the peak values of the servo burst patterns A to D into digital data in synchronism with the sampling pulses SP supplied from the servo PLL circuit 201. The peak values of the patterns A to D are held by a peak hold circuit (not shown). The position error detector 25 outputs the position error data while the sampling pulses AS to DS remain at high level. As indicated above, the CPU 10 calculates the position error (distance and direction) which the read head 20 has with respect to the target track.

(Servo Decoder, Error Detector, Peripheral Circuits)

The present embodiment is characterized in that the servo circuit 9 includes the position error detector 25 and the servo decoder 26. As shown in FIG. 4, the servo circuit 9 has circuits peripheral to the detector 25 and the decoder 26. The peripheral circuits are a servo area detector 50, a servo sync detector 51, a counter (A) 52, and a counter (B) 53.

The servo area detector 50 detects a servo detecting pattern DP (a dibit pattern) from the read signal RS output from the read head 20 and generates a start signal, as shown in FIGS. 9A and 9C. The start signal is supplied to the counter (A) 52. That is, the detector 50 detects the servo sector at which the read head 20 is located and initiates the reproduction of the servo data.

In response to the start signal, the counter (A) 52 starts counting the pulses of the servo clock signal SC output from the servo PLL circuit 21, as shown in FIGS. 9B and 9C. The count of the counter (A) 52 is used to control the timing of turning on the servo sync detector 51 and the timing of turning on the digital phase comparator 40 of the servo PLL circuit 21. The counter (A) 52 outputs an on-signal ON1 to the digital phase comparator 40 as illustrated in FIG. 9E.

The servo sync detector 51 searches the sync area of the servo code (see FIG. 9I) and supplies a start signal to the servo decoder 26 and the counter (B) 53. Upon receipt of the start signal, the servo decoder 26 starts decoding the servo code as shown in FIG. 9G, and the counter (B) 53 starts counting the pulses of the servo clock signal SC output from the servo PLL circuit 201 (see FIG. 9D). The count of the counter (B) 53 is used to control the timing of turning on the digital phase comparator 40 of the servo PLL circuit 201 and the timing of turning on the position error detector 25 (see FIG. 10C). The counter (B) 53 outputs an on-signal ON2 to the digital phase comparator 40 and an on-signal PT to the position error detector 25 (see FIGS. 10E and 10G). Upon receipt of the on-signal PT, the detector 25 starts generating position error data.

(Operation of Position Error Detector 25)

How the position error detector 25 performs its function will be explained, with reference to FIGS. 8A and 8B.

As shown in FIG. 8A, the preamble patterns (PLL sync patterns) P2 to P5 which the servo PLL circuit 201 uses to effect phase acquisition are recorded in an area for the servo burst data. Using these preamble patters P2 to P5, the servo PLL circuit 201 starts phase acquisition, thereby generating sampling pulses SP (i.e., a servo clock signal SC to be selected by the clock switching circuit 22). The sampling pulses SP are supplied to the A/D converter 32.

As shown in FIG. 8B, the A/D converter 32 samples the amplitude values P1 to Pn (positive peak values) and amplitude values Q1 to Qn (negative peak values) of, for example, the burst pattern A, in synchronism with the sampling pulses SP, thereby converting the burst pattern A to digital data. The amplitudes values P1 to Pn and Q1 to Qn are supplied via the digital filter 23 to the position error detector 25. The position error detector 25 calculates the average amplitude $$\left( \frac{1}{n} \sum_{i=1}^{n} (Pi - Qi) \right)$$

of the burst pattern A and generates position error data A representing the average amplitude. Further, the detector 25 calculates average amplitudes for the other burst patterns B, C and D and generates position error data items B, C and D representing these average amplitudes. The position error data items A, B, C and D are supplied to the CPU 10.

The data reproducing apparatus described above has not only the read PLL circuit 200 used to reproduce the user data, but also the servo PLL circuit 201 used to reproduce the servo data which contains a servo code and burst data. The clock switching circuit 22 selects the servo clock signal SC output from the servo PLL circuit 201 and supplies the signal SC as sampling pulses to the A/D converter 32. The A/D converter 32 converts the servo code and the servo burst data to digital data items, which are supplied to the servo decoder 26 and the position error detector 25, respectively. Thus, the servo data is reproduced while the CPU 10 is outputting the servo gate signal SG, in the same way as the user data.

Using these preamble patters P1 to P5 recorded in the servo sector (servo area), the servo PLL circuit 201 performs phase acquisition, thereby generating a servo clock signal SC which can be used to reproduce the servo data. The position error detector 25 calculates the average of the peak values of the servo burst patterns A to D, which will be used to reproduce digital servo data. Therefore, even if the read head 20 which is an MR head has CD offset, the amplitude of the read signal can be detected with high precision. In addition, the use of the servo PLL circuit 201 makes it possible to reproduce the servo data with a low error rate despite that the servo data is different from the user data in frequency characteristic.

(Modification of the Embodiment)

As described above, the servo PLL circuit 201 is a digital circuit. The circuit 201 may be replaced by an analog servo PLL circuit as illustrated in FIG. 15. In the modified data reproducing apparatus of FIG. 15, the read signal RS which is an analog signal read by the read head 20 and passed through the low-pass filter 31 (FIG. 1) is input to a slice level detector 60 and a peak detector 61. The signal RS has the waveform shown in FIG. 16A. The slice level detector 60 generates from the read signal RS a pulse signal SD illustrated in FIG. 16B, by using a predetermined slice level. The peak detector 61 performs zero-crossing, thereby generating a pulse signal PD shown in FIG. 16C which represents the peaks of the read signal RS. Both signals SD and PD are supplied to a filter 62, which generates a noise-free pulse signal FO shown in FIG. 16D. The pulse signal FO is supplied to the analog servo PLL circuit.

As shown in FIG. 15, the analog servo PLL circuit comprises a phase comparator 63, a charge pump 64, a loop filter 65 and a VCO 66. It generates a sync clock signal PLLC from the pulse signal FO. The clock signal PLLC is supplied to a servo decoder 67. Using the clock signal PLLC as a window, the servo decoder 67 determines "1" pulses and "0" pulses contained in the pulse signal FO. Thus, the read signal RS is converted to a servo code which is shown in FIG. 16E.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for reproducing user data recorded in a plurality of user data areas provided on a disk and servo data recorded in a plurality of servo areas provided on the disk and containing servo burst data and a servo code, said apparatus comprising:

head means for reading the servo data from the servo areas of the disk and the user data from the user areas of the disk and for generating analog read signals from the servo data and the user data;

read PLL means for generating a phase-synchronizing clock signal for reproducing the user data;

servo PLL means for generating a phase-synchronizing clock signal for reproducing the servo data;

read data reproducing means for reproducing the user data which is digital data, from the analog read signals generated by said head means, at timing defined by the phase-synchronizing clock signal generated by said read PLL means; and servo data reproducing means for reproducing the servo data which is digital data, from the analog read signals generated by said head means, at timing defined by the phase-synchronizing clock signal generated by said servo PLL means.

2. The apparatus according to claim 1, wherein a servo detecting signals for detecting the areas in which the servo data is recorded, sync signals for reproducing the servo code, and preamble signals for determining the timing of reproducing the servo burst data are recorded in the servo areas of the disk; and said servo data reproducing means starts reproducing the servo data in response to a servo detecting signal read by said head means, starts reproducing the servo code in response to a sync signal read by said head means, and reproduces the servo burst data in accordance with the synchronizing clock signal output by said servo PLL means which performs phase synchronization in response to the preamble signals read by said head means.

3. The apparatus according to claim 1, further comprising clock switching means for selecting one of two phase-synchronizing clock signals generated by said read PLL means and said servo PLL means, respectively, said clock switching means selecting and supplying to said servo reproducing means the phase-synchronizing clock signal generated by said servo PLL means, in accordance with a servo gate signal which determines the timing of starting servo operation to position said head means at a target position on the disk.

4. The apparatus according to claim 1, which further comprises A/D converter means for converting the analog read signals read by said head means, and in which said read data reproducing means generates sampling pulses which said A/D converter means requires to generate digital data, at timing defined by the phase-synchronizing clock signal generated by said read PLL means, and reproduces the user data from the digital data output from said A/D converter; and said servo data reproducing means generates sampling pulses which said A/D converter means requires to generate digital data, at timing defined by the phase-synchronizing clock signal generated by said read PLL means, and reproduces the servo code and the servo burst data from the digital data output from said A/D converter.

5. The apparatus according to claim 1, wherein each of said servo areas includes a sync signal area in which a sync signal is recorded immediately before the servo code, for determining the timing at which said servo PLL means starts generating a phase-synchronizing clock signal to reproduce the servo code.

6. A servo apparatus for use in a disk storage system, designed to position a head at a target position on a disk and to reproduce servo data recorded in a plurality of servo areas provided on the disk having user data areas, the servo data containing servo burst data and a servo code, said apparatus comprising:

a disk having a plurality of servo areas, in which which there are recorded servo data and a servo detecting signal for detecting the area in which the servo data is recorded, said servo data containing a servo code representing a track address and servo burst data which contains quadrature burst patterns and preamble signals;

head means for reading the servo data from the servo areas of the disk and the user data from the user areas of the disk and for generating analog read signals from the servo data and the user data;

read PLL means for generating a phase-synchronizing clock signal for reproducing the user data;

servo PLL means for generating a phase-synchronizing clock signal for reproducing the servo data and performing phase acquisition in accordance with the preamble signals read by said head means when said servo burs data is reproduced;

read data reproducing means for reproducing the user data which is digital data, from the analog read signals generated by said head means, at timing defined by the phase-synchronizing clock signal generated by said read PLL means;

servo data reproducing means for reproducing the servo data which is digital data, from the analog read signals generated by said head means, at timing defined by the phase-synchronizing clock signal generated by said servo PLL means.

positioning means for moving said head means to a target track on the disk in accordance with the servo code reproduced by aid servo reproducing means, and for positioning said head means at the target position in the target track in accordance with the servo burst data.

7. The apparatus according to claim 6, further comprising clock switching means for selecting one of two phase-synchronizing clock signals generated by said read PLL means and said servo PLL means, respectively, said clock switching means selecting and supplying to said servo reproducing means the phase-synchronizing clock signal generated by said servo PLL means, in accordance with a servo gate signal which determines the timing of starting servo operation to position said head means at a target position on the disk.

8. The apparatus according to claim 6, wherein said servo data reproducing means starts reproducing the servo data in response to a servo detecting signal read by said head means, starts reproducing the servo code in response to a sync signal read by said head means, and reproduces the servo burst data in accordance with the synchronizing clock signal output by said servo PLL means which performs phase synchronization in response to the preamble signals read by said head means.

9. The apparatus according to claim 6, which further comprises A/D converter means for converting the analog read signals read by said head means, and in which said read data reproducing means generates sampling pulses which said A/D converter means requires to generate digital data, at timing defined by the phase-synchronizing clock signal generated by said read PLL means, and reproduces the user data from the digital data output from said A/D converter; and said servo data reproducing means generates sampling pulses which said A/D converter means requires to generate digital data, at timing defined by the phase-synchronizing clock signal generated by said read PLL means, and reproduces the servo code and the servo burst data from the digital data output from said A/D converter.

10. The apparatus according to claim 6, wherein said servo data reproducing means reproduces, as digital data, amplitude values which said head means has output for the quadrature burst patterns, reproduces, as the servo burst data, an average of the amplitude values of the quadrature burst patterns, and has means for calculating, from the servo burst data reproduced, a position error required for moving said head means to a target position.

11. A servo apparatus for use in a disk storage system, designed to position a head at a target position on a disk and to reproduce servo data recorded in a plurality of servo areas provided on the disk having user data areas, the servo data containing servo burst data and a servo code, said apparatus comprising:

a disk having a plurality of servo areas, in which there are recorded servo data and a servo detecting signal for detecting the area in which the servo data is recorded, said servo data containing a servo code representing a track address and servo burst data which contains burst patterns and preamble signals;

head means for reading the servo data from the servo areas of the disk and the user data from the user areas of the disk and for generating analog read signals from the servo data and the user data;

read PLL means for generating a phase-synchronizing clock signal for reproducing the user data;

servo PLL means for generating a phase-synchronizing clock signal for reproducing the servo data and performing phase acquisition in accordance with the preamble signals read by said head means when said servo burs data is reproduced;

read data reproducing means for reproducing the user data which is digital data, from the analog read signals generated by said head means, at timing defined by the phase-synchronizing clock signal generated by said read PLL means;

servo data reproducing means for reproducing the servo code and servo burst data from the analog read signals generated by said head means, at timing defined by the phase-synchronizing clock signal generated by said servo PLL means, said servo code being digital data representing positive peak values (Pn) and negative peak values (Qn) of the analog read signals generated for the quadrature burst patterns, and said servo burst data being digital data which representing an average $$\left( \frac{1}{n} \sum_{i=1}^{n} (Pi - Qi) \right.$$

of the differences, each between the positive and negative peak values of each quadrature burst pattern; and positioning means for moving said head means to a target track on the disk in accordance with the servo code reproduced by aid servo reproducing means, and for positioning said head means at the target position in the target track in accordance with the servo burst data.

* * * * *